United States Patent

Gotshall

[15] 3,642,512

[45] Feb. 15, 1972

[54] METHOD OF COATING FINELY GROUND CARBON WITH OILS

[72] Inventor: William W. Gotshall, 3081 Walma Drive, Orchard Lake, Mich. 48034

[22] Filed: Mar. 25, 1970

[21] Appl. No.: 22,645

[52] U.S. Cl............................................................106/307
[51] Int. Cl...............................................................C09c 1/44
[58] Field of Search................................................106/307

[56] References Cited

UNITED STATES PATENTS

| | | | |
|---|---|---|---|
| 2,040,770 | 5/1936 | Grote | 106/307 |
| 3,356,520 | 12/1967 | Daniell | 106/307 |
| 3,404,019 | 10/1968 | Gotshall | 106/307 |
| 3,493,532 | 2/1970 | Gotshall | 106/307 |

*Primary Examiner*—James E. Poer
*Attorney*—Joseph C. Herring, Richard C. Willson, Jr. and Jack L. Hummel

[57] ABSTRACT

Carbon particles are covered with an organic liquid barrier against oxygenation by dissolving the barrier liquid in methanol to form a solution and mixing the solution into the carbon in a blender. The methanol is then evaporated off leaving a uniform film of the barrier liquid.

10 Claims, 1 Drawing Figure

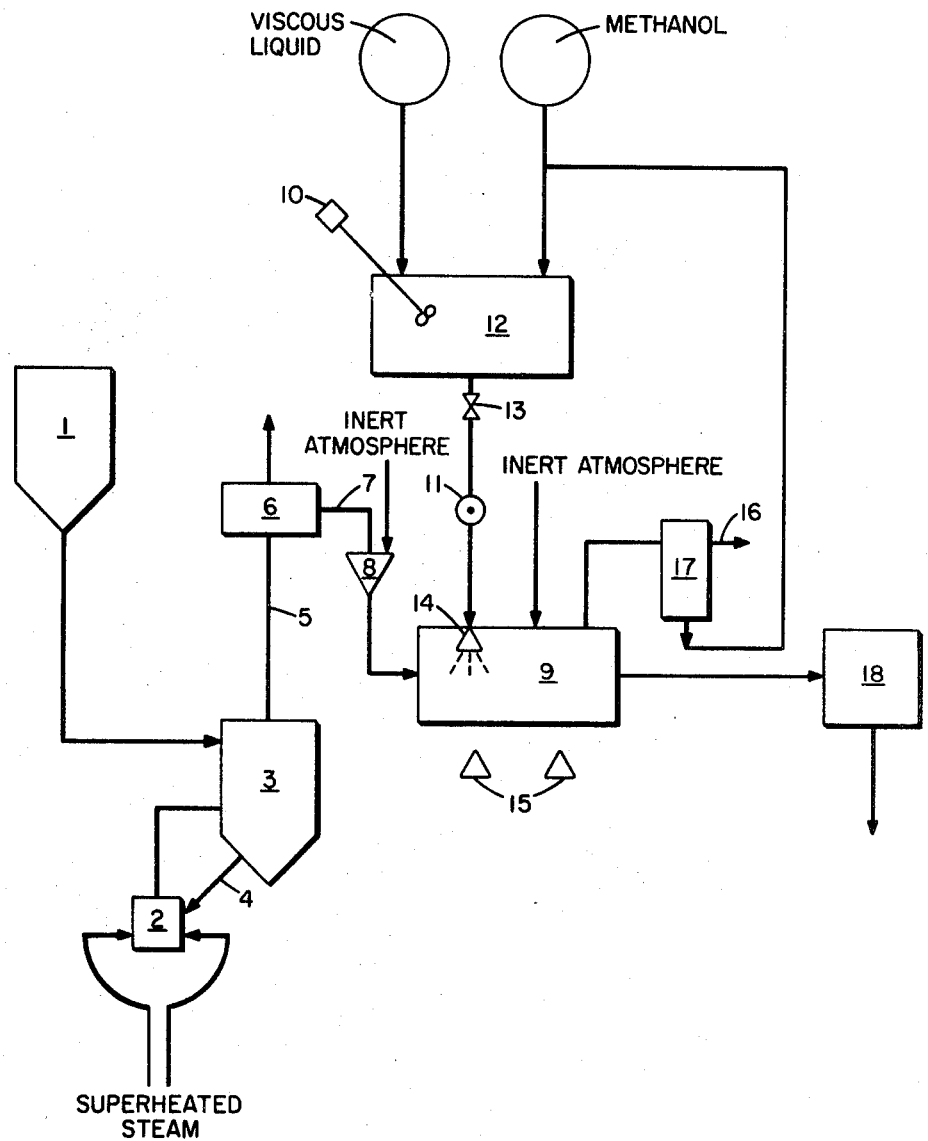

3,642,512

METHOD OF COATING FINELY GROUND CARBON WITH OILS

CROSS REFERENCES TO RELATED APPLICATIONS

The following U.S. patent applications relate to the general field of the invention: U.S. Patent application Ser. No. 22,648 filed March 25, 1970 (docket 690112-A-USA); Ser. No. 774,551 filed July 22, 1968 (docket 650017-M-USA); and Ser. No. 22,647 filed March 25, 1970 (docket 690116-A-USA).

BACKGROUND OF THE INVENTION

1. Field of the Invention

The present invention relates to the general field of pigments (classified in the U.S. Patent Office Class 106) and more particularly to subclass 307 thereof, "Elemental Carbon-containing Pigments, fillers or aggregates." Rubbers (synthetic and natural) and other elastomeric compositions containing the carbons of the present invention are classified in class 260, subclass 763, "Vulcanizable natural hydrocarbon gums with elemental carbon filler, dye or pigment."

2. Description of the Prior Art

The production of superior reinforcing agents by grinding cokes, chars, coals, and other carbonaceous materials in a nonoxidizing atmosphere, particularly in a fluid energy mill and protecting them until they are compounded into elastomeric compositions, are disclosed in the aforementioned related U.S. patent applications and as follows: U.S. Pat. Nos. 3,404,019 and 3,404,120 and divisional applications thereof, all to the inventor of the present application. Techniques for the production of vulcanizable elastomeric compositions containing carbon are taught in "Reinforcement of Elastomers" by Gerard Kraus, in "Introduction to Rubber Technology" by Maurice Morton, and in the references cited therein.

The techniques of the above-mentioned U.S. patents require that carbonaceous material be ground in a nonoxidizing atmosphere and thereafter be protected from oxygenation of the surface until it is compounded into a vulcanizable elastomeric composition. Preferably, this protection is accomplished by coating the individual carbon particles with viscous liquids which provide barriers against oxygenation. While such liquids can be applied to the carbon particles by conventional blending, e.g., by spraying hot liquid into a conventional solid-liquid blender, the small size of the particles and the viscosity of the liquids can result in uneven distribution and incomplete coating of the particles. Unprotected particles are subject to deleterious oxygenation as discussed in the aforementioned U.S. patents.

SUMMARY

1. General Statement of the Invention

The present invention rapidly and easily obtains highly uniform and complete coating of the ground carbon particles with the viscous organic liquid barrier. According to the invention, methanol is mixed with (dissolved into) the organic barrier liquid to form a methanol-organic barrier liquid solution containing from 1 to 50 percent, more preferably from 1.5 to 25 percent, and most preferably from 2 to 4 percent by weight of the organic barrier liquid. The lower viscosity solution thus formed is then mixed with the carbon particles to form a mass of kneadable or extrudable consistency which is then subjected to high torque mixing under a nonoxidizing atmosphere. The high torque mixing is continued to remove substantially all gaseous inclusions and the mass is formed as desired. The methanol is then evaporated, leaving the viscous organic liquid as a coating. Thus, the very high surface area of the ground carbon particles which have an average diameter of less than about 2.5 microns is substantially completely coated with organic liquid barrier, protecting against oxygenation.

2. Utility of the Invention

The coated carbon particles prepared by the processes of the present invention are useful in the manufacture of a wide variety of elastomeric products including mechanical rubber goods, tire carcasses and tread stocks, rubber extrusions, and similar materials made from vulcanizable elastomers such as natural and synthetic rubber, styrene-butadiene copolymer, butadiene-acrilonitrile copolymer, butyl rubber, ethylene-propylene-diolefin terpolymers, polyisoprene, vulcanizable polymeric elastomeric material containing double bonds and derived from chloroprenes or fluoroprenes.

BRIEF DESCRIPTION OF THE DRAWING

The drawing is a schematic representation of the apparatus utilized with the present invention.

DESCRIPTION OF THE PREFERRED EMBODIMENTS

1. Starting Materials:

a. Carbon materials

Carbonaceous materials suitable as starting materials for the present invention include delayed petroleum coke, fluid petroleum coke, anthracite coal, coke derived from coal, char, e.g., nonagglomerating materials derived from coal or by the techniques of copending application Ser. No. 22,648 filed Mar. 25, 1970 (Docket 690112-A-USA). Preferably the carbonaceous materials should contain from about 0.1 to about 10, more preferably from 1 to about 8, and most preferably from 2 to about 6 percent by weight volatile combustible matter based on the weight of carbon.

b. Organic Barriers

The organic materials utilized as barriers against oxygenation of the surface of the pulverized carbon are preferably hydrocarbons, more preferably aromatic hydrocarbons, and most preferably light catalytic cycle oils derived according to the techniques of the aforementioned application Ser. No. 22,648 (Docket 690112-A-USA). Suitable barrier liquids include paraffinic oils, e.g., hydrogenated gas oils and mineral oils; olefinic oils, e.g., cracked gasoline stocks, catalytic slurry oils, fatty acid salts, catalytic cycle oils, aromatic oils. Other suitable barrier liquids include: heavy catalytic cycle oil, clarified catalytic slurry oil, or aromatic extracts of either of the latter two oils. In general, barrier liquids should have a viscosity of about 10 to 75 Saybolt Seconds Universal (SSU) at 100° F., more preferably a viscosity of about 20 to about 50 seconds, and most preferably a viscosity of 30 to 45 seconds. The liquid will preferably boil within the approximate range of 200 to 900, more preferably 250 to 800, and most preferably 325–600°F. Stearic acid or zinc stearic may be employed in lieu of the liquids, but these are relatively expensive as compared to the organic liquids.

c. Vulcanizable Elastomers

Vulcanizable elastomers in general may be employed, but preferred among these will be those mentioned above under "Utility," and most preferred are natural rubber and styrene-butadiene copolymer (SBR).

2. Apparatus:

a. The preferred grinding mills for pulverizing the carbonaceous material are fluid energy mills of the type commonly referred to as "hurricane mills," e.g., the Model No. 30-10 mill manufactured by Majac, Inc. of Sharpsburg, Pa. The fluid energy mills can operate on a wide variety of inert, nonoxidizing atmospheres. By "nonoxidizing atmosphere" is meant herein, media which do not contain substantial quantities of free oxygen. Steam is the most preferred grinding media from the standpoint of economy, but nitrogen, helium, hydrogen, argon, carbon dioxide, carbon monoxide, and a wide variety of other gases commonly thought of as inert or reducing, may be utilized. For maximum economy in grinding, gases of lower molecular weights, e.g., hydrogen and steam, are preferred.

The autogenous grinding mill is conventionally operated, preferably at temperatures of from about 350 to about 800° F., more preferably from about 400 to about 700° F., and most preferably at 400–500° F. The classifier is operated to provide an average particle size (by weight) of less than about 2.5 microns with 99 percent by weight of the product having particle size of less than 5 microns. More preferred ranges are average particle size of less than 1.5 and 99 percent by weight less than 3 microns.

The classifier is preferably a centrifugal type and is operated under nonoxidizing atmosphere.

The invention will be more fully understood by reference to the following example which is to be included as merely illustrative thereof.

EXAMPLE I

According to the drawing, a granulated raw fluid coke produced by granulating a fluid petroleum coke of the type produced according to the methods of A. Voorhies, Fluid Coking Proceedings of the 4th World Petroleum Congress, Section III/F, page 360 and Petroleum Processing, March, 1956, pages 135 to 137 is fed from bin 1 to a Model No. 30–10 mill 2, manufactured by Majac, Inc. of Sharpsburg, Pa. Steam is utilized as the grinding fluid at a sonic velocity at approximately 400 to 800° F. (after exiting from the nozzle) and 100 to 150 p.s.i.g. nozzle pressure is maintained in the mill. This particular mill has opposed nozzles which cause a stream of particles to impinge upon a second stream of particles causing highly efficient autogenous grinding. The grinding process is continued with particles having an average particle size of below about 1.5 microns and 99 percent by weight having a particle size below about 3 microns being continuously withdrawn from the classifier 3 of the Majac Mill 2. Oversize particles are returned to the pulverizer for further grinding through conduit 4. Steam and ground carbon of the desired maximum particle size are propelled by steam pressure through conduit 5 to dust collector 6 which recovers the coke particles and vents the steam. The coke particles then travel through conduit 7 into a conventional hopper 8. An inert atmosphere, in this case nitrogen, is constantly bled through the hopper to protect the powder from contact with oxygen. When a charge of approximately 200 pounds has accumulated in the hopper 8 it is valved off from further addition of carbon particles and carbon particles from hopper 8 are admitted to an inert-blanketed ribbon-type dry blender 9.

One hundred pounds of methanol and eight pounds of an aromatic oil having a viscosity of approximately 35 seconds SSU at 100° F. and consisting of a 50 percent by weight/50 percent by weight mixture of heavy catalytic cracking cycle oil (comprising primarily alkyl naphthalenes) (HCCO) and mixed xylenes are mixed by means of a conventional propeller-type mixer 10 extending into mixing tank 12. The resulting mixture has a viscosity of approximately 0.05 centipoises at 100° F. When valve 13 located on the bottom of mixing tank 12 is opened, pump 11 forces the HCCO/xylenes methanol mixture through sprayhead 14 located within blender 9. The mixture is thus uniformly sprayed onto the carbon particles as they are agitated by the ribbon element in the ribbon-type blender 9. After approximately 20 minutes of blending, the carbon particles are uniformly coated with the methanol-HCCO-xylenes solution. Heating elements 15 located in contact with dry blender 8 are then used to heat the interior of the dry blender to approximately 175° F. to substantially remove the methanol which is swept away by the inert atmosphere. The inert atmosphere is vented through vent 16 and the methanol is substantially recovered by partial condenser 17, cooled by water. The recovered methanol is then recycled.

The particles, now uniformly coated with HCCO organic liquid barrier against oxygenation, are fed to a pelletizer 17 which presses them into pellets of approximately 3 millimeter diameter. The particles are then stored in polyethylene-lined fiberboard drums until they are conventionally compounded into vulcanizable elastomeric compositions which are conventionally molded and vulcanized to form various molded elastomeric articles. Testing of the finished vulcanizable elastomers indicates that the carbon particles have imparted the high modulus characteristic of the products of U.S. Pat. Nos. 3,404,019 which have been protected from oxygenation of the surface. The freedom from substantial oxygenation is further confirmed in rubber testing by the optimum vulcanization time remaining substantially unchanged after prolonged storage of the finished carbon particles.

4. Modifications of the Invention:

It should be understood that the invention is capable of a variety of modifications and variations which will be made apparent to those skilled in the art by a reading of the specification and which are to be included within the spirit of the claims appended hereto. For example, the methanol may be removed by reducing the pressure within the dry blender or by heating to from about 100 to about 300° F., more preferably from about 160 to about 350° F.; the liquid barrier utilized may have a viscosity of about 10 to 70, more preferably about 15 to 50, and most preferably about 30 to 40 Saybolt Universal Seconds at 100° F.; from about 0.5 to about 10 percent, more preferably 1 to about 8 percent, and most preferably from 2 to about 4 percent by weight of barrier liquid (excluding methanol) will be used, based on the weight of the carbon particles protected.

What is claimed is:

1. In a process for coating carbon particles having an average diameter of less than about 2.5 microns with an organic liquid barrier against oxygenation, said liquid barrier having a viscosity of from about 10 to about 70 Saybolt Universal Seconds at 100° F., the improvement comprising mixing said organic liquid barrier with methanol to form a solution containing from 1 to about 50 percent by weight of organic barrier liquid, thereafter mixing the solution thus formed with carbon particles in an amount of from 0.5 to about 10 percent by weight of barrier liquid excluding methanol based on the weight of the carbon to form a mass of kneadable or extrudable consistency and subjecting said kneadable or extrudable mass to high-torque mixing under a nonoxidizing atmosphere, subdividing said mass as desired and substantially removing said methanol by evaporation while leaving said organic barrier liquid substantially in place on the surface of said carbon particles, wherein the resulting carbon particles have a highly uniform coating of said organic liquid barrier.

2. The process of claim 1 wherein the carbon particles are finely divided coke ground under a nonoxidizing atmosphere.

3. The process of claim 2 wherein the particles are ground in a fluid-energy mill.

4. The process of claim 1 wherein the organic liquid barrier has a boiling point in the range of from about 200 to about 900° F. and a viscosity in the range of from about 15 to about 50 seconds Saybolt Universal at 100° F.

5. The process of claim 4 wherein the organic liquid barrier comprises a member of the class consisting of paraffinic and olefinic oils, catalytic slurry oil, fatty acid, fatty acid salts, catalytic cycle oils, and aromatic oils.

6. The process of claim 5 in which the organic liquid barrier comprises an aromatic oil.

7. The process of claim 6 wherein the organic liquid barrier comprises heavy catalytic cycle oil, clarified catalytic slurry oil, or aromatic extracts of either of the foregoing.

8. The process of claim 2 wherein the nonoxidizing atmosphere comprises superheated steam.

9. The process of claim 1 wherein the nonoxidizing atmosphere comprises nitrogen, helium, hydrogen, argon, carbon dioxide, carbon monoxide, or mixtures thereof.

10. The process of claim 3 wherein the nonoxidizing atmosphere is superheated steam.

* * * * *